United States Patent [19]
Kasuga et al.

[11] Patent Number: 4,559,380
[45] Date of Patent: Dec. 17, 1985

[54] POLYACETAL RESIN COMPOSITION

[75] Inventors: Takuzo Kasuga, Tokyo; Yukio Ikenaga, Fuji; Masami Yamawaki, Fuji; Keizo Tanimura, Fuji, all of Japan

[73] Assignee: Polyplastics Company, Ltd., Osaka, Japan

[21] Appl. No.: 720,063

[22] Filed: Apr. 8, 1985

Related U.S. Application Data

[63] Continuation of Ser. No. 547,813, Nov. 1, 1983, abandoned.

[30] Foreign Application Priority Data

Nov. 25, 1982 [JP] Japan ................. 57-206408

[51] Int. Cl.$^4$ ............................................. C08K 5/09
[52] U.S. Cl. .................................... 524/317; 524/377; 524/394; 524/400; 524/910
[58] Field of Search ............... 524/317, 377, 394, 400, 524/910

[56] References Cited

U.S. PATENT DOCUMENTS 3,553,117  1/1971  Gutweiler .
3,658,744  4/1972  Brindell et al. .
4,274,986  6/1981  Ikenaga et al. ............... 524/910
4,351,916  9/1982  Kohan ........................ 524/377

FOREIGN PATENT DOCUMENTS 7400170  7/1974  Netherlands .

Primary Examiner—Lewis T. Jacobs
Attorney, Agent, or Firm—Robert M. Shaw

[57] ABSTRACT

A polyacetal composition which comprises polyacetal, an aliphatic ester of a polyhydric alcohol having a hydroxy group, polyethylene glycol, and an organometallic salt, wherein the organometallic salt is present in an amount of from 0.01 to 5 percent by weight based on the total composition.

7 Claims, No Drawings

POLYACETAL RESIN COMPOSITION

This application is a continuation of application Ser. No. 547,813, filed Nov. 1, 1983, now abandoned.

The present invention relates to a polyacetal resin composition showing excellent antistatic effect, surface luster, moldability and the like.

Thermoplastic polyacetal resin, which is superior in mechanical properties, thermal properties, long-range properties, moldability and the like, has been extensively used as an engineering resin in the manufacture of functional parts for use in various industries such as the mechanical industry and the electric industry. However, such thermoplastic polyacetal resins tend to develop a static charge which can cause problems such as electrostatic noise, surface stain, adhesion and the like since these resins have higher surface resistance than most plastics. Various antistatic agents have been used in order to overcome such problems. Although such antistatic agents are effective, they do possess certain disadvantages. For example, ionic antistatic agents are not desirable because they lead to discoloration, the reduction of thermal stability and the like. Although non-ionic antistatic agents are used to avoid detrimental effects produced by the ionic agents, in general non-ionic antistatic agents produce a lesser antitstatic effect, thus it is required to add a greater amount of them in order to lower the electrostatic characteristics of the thermoplastic polyacetal resin to a practical usable level. However, the addition of large amounts of non-ionic antistatic agents leads to a decrease in the mechanical properties and moldability of products molded from the resin because the non-ionic agents also act as lubricants. Further, solid antistatic agents such as glycerine monostearate are apt to form wax-like bleed on the surface of molded products and liquid antistatic agents are apt to form liquid bleed on the surface of molded products, which is detrimental to the external appearance and function of molded products. The addition of a large amount of non-ionic antistatic agents also leads to a reduction of thermal stability.

U.S. Pat. No. 4,274,986 discloses a polyacetal molding composition which exhibits an improved reduction in the electrostatic property without producing detrimental effects such as coloring, excess bleed, reduction of thermal stability and change in moldability. However, as a result of repeated investigations on the effects of various kinds of substances upon polyacetal, the inventors found that the addition of a small amount of organometallic salt to the polyacetal composition produces a composition having excellent thermal stability, moldability and antistatic effect. This led to the present invention.

That is to say, the present invention relates to a polyacetal resin composition obtained by adding organometallic salts to a composition comprising polyacetal, aliphatic esters of polyvalent alcohols having hydroxyl groups and polyethylene glycol.

Organometallic salts added to polyacetal include the salts of natural organic acids or synthetic organic acids similar to natural organic acids such as lauric acid, palmitic acid, stearic acid, hydroxystearic acid, behenic acid, citric acid, tartaric acid and lactic acid, with a metal having a strong ionization tendency such as calcium, magnesium and lithium. Calcium stearate, calcium tartrate, calcium citrate, calcium hydroxystearate and the like are preferred.

The metallic salts are added at a ratio of 0.01 to 5% by weight based on the whole composition. The addition thereof at a ratio less than 0.01 to 5% by weight leads to an insufficient effect while the addition thereof at a rato more than 0.01 to 5% by weight leads to a decrease in the physical properties of molded products. The addition thereof at a ratio of 0.05 to 0.5% by weight based on the whole composition is preferable.

Polyacetal homopolymers or copolymers may be employed in the present invention. The degree of polymerization of the said polyacetal is not limited. It is necessary for the polyacetal to have moldable fluidity and sufficient mechanical properties as molded.

Also various kinds of antioxidants and anti-acid agents may be added to the composition of the present invention.

The antioxidants useful in the present invention include phenols such as 2,2'-methylene-bis(4-methyl-6-t-butylphenol), hexamethyleneglycol-bis[$\beta$-(3,5-di-t-butyl-4-hydroxyphenol)propionate], tetrakis[methylene-3(3,5-di-t-butyl-4-hydroxy-phenyl)propionate]methane, triethyleneglycol-bis-3-(3-t-butyl-4-hydroxy-5-methylphenyl)propionate, 1,3,5-tri-methyl-2,4,6-tris(3,5-di-t-butyl-4-hydroxy-benzyl)benzene, n-octadecyl-3-(4'-hydroxy-3',5'-di-t-butylphenol)propionate, 4,4'-methylene-bis(2,6-di-t-butylphenol), 4-hydroxymethyl-2,6-di-t-butylphenol, 1,3,5-tris(4-t-butyl-3-hydroxy-2,6-dimethylbenzyl)isocyanurate, N,N'-hexamethylenebis(3,5-di-t-butyl-4-hydroxy-hydroxynamide, hindered phenols, condensation products of N-phenyl-N'-isopropyl-p-phenylenediamine, N,N'-diphenyl-p-phenylenediamine, 4,4'-bis(4-$\alpha$,$\alpha$-dimethylbenzyl)diphenylamine or diphenylamine with acetone, and amines such as N-phenyl-$\beta$-naphthylamine and N,N'-di-$\beta$-naphthyl-p-phenylenediamine.

Further, the anti-acid agents useful in the present invention include urea, dicyandiamide, melamine, polyamide and the like.

The aliphatic esters of polyvalent alcohols having hydroxyl groups useful in the polyacetal resin composition of the present invention include aliphatic ester alcohols having at least one hydroxyl group and at least one ester group, such as monoglyceride of stearic acid, palmitic acid, myristic acid and lauric acid, obtained by the reaction of natural aliphatic acids such as lauric acid, myristic acid, palmitic acid, stearic acid, alaquinic acid, behenic acid, oleic acid and hydroxystearic acid or synthetic aliphatic acids similar to the natural aliphatic acids with polyvalent alcohols such as glycerine, pentaerythritol, diglycerine and sorbitol.

Although optional polyethyleneglycols, including liquid ones having comparatively small molecular weights to solid ones having comparatively large molecular weights, can be used as the polyethyleneglycol in the present invention, polyethylene glycols having molecular weights of 1,000 to 20,000 are preferably used. The aliphatic ester of a polyhydric alcohol is used in a conventional amount, preferably at least 0.05 percent by weight, especially from 0.05 to 5 percent by weight. The polyethylene glycol is used also in a conventional amount, preferably at least 0.1 percent by weight, especially from 0.1 to 10 percent by weight. It is desirable that the composition of the present invention is prevented from bleeding by adjusting the respective proportions of the ingredients.

It has been mentioned that U.S. Pat. No. 4,274,986 relates to a composition which comprises polyacetal, a polyhydric alcohol having hydroxy groups and polyethyleneglycol and eventually provides an excellent antistatic property. In comparison with that prior art, a polyacetal resin composition according to the present invention shows thermal stability and further improved antistatic property resulting from the addition of organometallic salts thereto.

A composition according to the present invention can be prepared in a mixer such as an extruder.

The antistatic effect according to the present invention can be sufficiently achieved even in the presence of a resin in addition to polyacetal, for example EVA, polyurethane and the like. In addition, various kinds of additives such as inorganic fillers, for example glass, mica and talc and pigments may be added. Further, other antistatic agents may also be added.

The present invention will be described in detail below by reference to the preferred embodiments and the reference embodiments. The evaluation of the antistatic property was carried out by measuring a half-value period of electrostatic voltage after maintaining a flat plate made of the polyacetal resin composition prepared by extrusion molding, for 48 hours at 20° C. and 65 RH %. The evaluation of the stability of the polyacetal resin composition was carried out by the quantitative analysis of formaldehyde extracted into hot water after submerging 50 g of pellets of a composition of the present invention in water and boiling them for one hour at 100° C.

PREFERRED EMBODIMENTS 1 TO 8, REFERENCE EMBODIMENT 1

Polyethylene glycol, glycerine monostearate and organometallic salts are added to acetal copolymer (Duracon M270-02 manufactured by Polyplastics Co., Ltd.) at various kinds of ratio as shown in Table 1 and the resulting compositions are extruded by a 40 mm-monoaxial extruder to obtain pellets. Then the resulting pellets are first dried at 80° C. and then injection molded to obtain test pieces. The resulting test pieces are tested for anti-static property as described above. The results are shown in Table 1 together with the results of the stability measurement carried out on pellets of the composition. In addition, the results of evaluations similar to those in the preferred embodiments 1 to 8 for compositions not containing the organometallic salts are also shown in Table 1 by way of comparison.

It is found from the above described results that the compositions of the present invention exhibit excellent anti-static properties and superior stability.

TABLE 1

| | Additive (parts by weight) | | | Result | |
|---|---|---|---|---|---|
| | Glycerine monostearate | Polyethylene glycol | Organometallic salt | Half-value period of electrostatic voltage (seconds) | Formaldehyde extracted (% by weight) |
| Preferred embodiment | | | | | |
| 1 | 0.25 | 0.75 | (Ca—St) 0.1 | 0.5 | 0.0189 |
| 2 | 0.25 | 0.75 | (Ca—Ta) 0.1 | 0.5 | 0.0184 |
| 3 | 0.25 | 0.75 | (Ca—StOH) 0.1 | 0.6 | 0.0195 |
| 4 | 0.25 | 0.75 | (Li—Ci) 0.1 | 0.5 | 0.0228 |
| 5 | 0.15 | 0.85 | (Ca—St) 0.3 | 14.0 | 0.0165 |
| 6 | 0.15 | 0.85 | (Ca—Ta) 0.3 | 0.9 | 0.0220 |
| 7 | 0.15 | 0.85 | (Ca—StOH) 0.3 | 4.0 | 0.0220 |
| 8 | 0.15 | 0.85 | (Li—Ci) 0.1 | 1.5 | 0.0247 |
| 9 | 0.15 | 2.0 | (Ca—StOH) 0.1 | 4 | 0.012 |
| 10 | 0.15 | 2.0 | (Ca—Ta) 0.1 | 3 | 0.016 |
| 11 | 0.20 | 1.0 | (Ca—Ci) 0.1 | 2 | 0.014 |
| 12 | 0.20 | 1.0 | (Ca—StOH) 0.1 | 4 | 0.015 |
| 13 | 0.50 | 0.5 | (Ca—StOH) 0.1 | 0.5 | 0.014 |
| 14 | 0.35 | 0.75 | (Ca—StOH) 0.1 | 0.5 | 0.015 |
| Reference embodiment | | | | | |
| 1 | 0.25 | 0.75 | — | 24.6 | 0.0260 |
| 2 | 0.15 | 0.85 | — | 60 | 0.0286 |
| 3 | 0.20 | 1.0 | — | 46 | 0.0180 |

Ca-St: Calcium stearate
Ca-Ta: Calcium tartrate
Ca-StOH: Calcium hydroxystearate
Li-Ci: Lithium citrate
Ca-Ci: Calcium citrate
Polyethylene glycol: molecular weight of 4,000

We claim:

1. A polyacetal composition which comprises polyacetal, an aliphatic ester of a polyhydric alcohol having a hydroxy group, polyethylene glycol, and an organometallic salt, wherein the organometallic salt is present in an amount of from 0.01 to 5 percent by weight based on the total composition.

2. A polyacetal composition as claimed in claim 1, in which the aliphatic ester of a polyhydric alcohol is present in an amount of at least 0.05 percent by weight and the polyethylene glycol is present in an amount of at least 0.1 percent by weight.

3. A polyacetal composition as claimed in claim 1, in which the organometallic salt is a metal salt of an organic acid, the metal is selected from the group consisting of calcium, magnesium and lithium and the organic acid is selected from the group consisting of lauric acid, palmitic acid, stearic acid, hydroxy-stearic acid, behenic acid, citric acid, tartaric acid and lactic acid.

4. A polyacetal composition as claimed in claim 1, in which the organometallic salt is selected from the group consisting of calcium stearate, calcium tartrate, calcium citrate, calcium hydroxystearate and lithium citrate.

5. A polyacetal composition as claimed in claim 1, in which the polyacetal is a homopolymer or a copolymer.

6. A polyacetal composition as claimed in claim 1, which further comprises an antioxidant, an anti-acid agent, another resin, an antistatic agent, an inorganic filler and/or a coloring matter.

7. A polyacetal molded article molded from the polyacetal composition of claim 1.

* * * * *